L. CROUCH.
Attaching Hubs to Axles.
No. 70,532. Patented Nov 5. 1867.
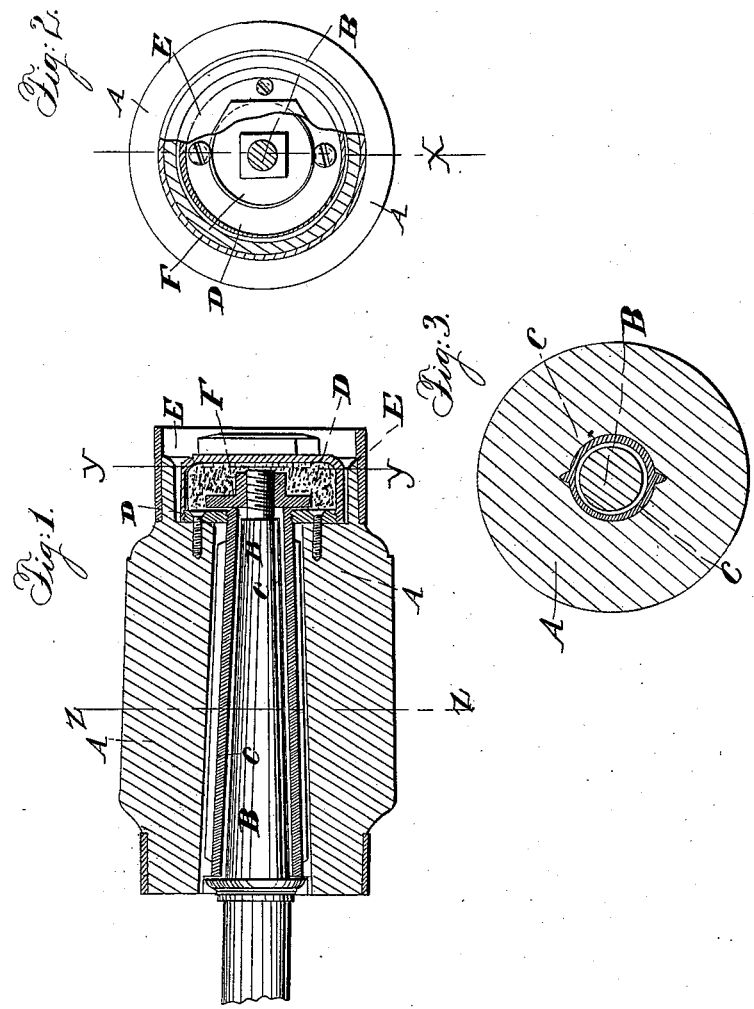

s
United States Patent Office.

L. CROUCH, OF BARABOO, WISCONSIN.

Letters Patent No. 70,532, dated November 5, 1867.

---

IMPROVEMENT IN ATTACHING WHEELS TO VEHICLES.

---

*The Schedule referred to in these Letters Patent and making part of the same.*

---

TO ALL WHOM IT MAY CONCERN:

Be it known that I, L. CROUCH, of Baraboo, in the county of Sauk, and State of Wisconsin, have invented a new and useful Improvement in Attaching Wheels to Axles; and I do hereby declare that the following is a full, clear, and exact description thereof, which will enable others skilled in the art to make and use the same, reference being had to the accompanying drawings, forming part of this specification.

Figure 1 is a longitudinal section of a hub of a wheel attached to an axle illustrating my invention, taken through the line $x$ $x$, fig. 2.

Figure 2 is a front end view of the same, partly in section, through the line $y$ $y$, fig. 1.

Figure 3 is a cross-section of the same, taken through the line $z$ $z$, fig. 1.

Similar letters of reference indicate corresponding parts.

My invention has for its object to improve the manner of attaching the hubs of wheels to their axles, so as to make the connection more secure, convenient, and less liable to get out of order; and it consists in the combination of an extra nut with the hub, axle-box, axle-nut, and cap, as hereinafter more fully described.

A is the hub, B is the axle, and C is the axle-box. The box C is inserted in the hub A in the ordinary manner. D is a nut, which screws upon the projecting end of the box C, as shown in fig. 1. The nut D, when screwed up, is secured to the end of the hub A by two or more screws passing through the said nut, and screwing into the said hub, so as to secure and hold the axle-box C firmly in place. Upon the outer edge of the nut D is formed a screw-thread, upon which the cap screws, as shown in fig. 1.

The interposition of the nut D between the axle-box C and the cap E enables the flange of the nut F, which screws upon the end of the axle B, to be made broader than it can be when the cap E is screwed directly upon the axle-box itself in the ordinary manner; and, at the same time, it guards against the liability of the said axle-nut F to catch upon the cap E, so that, as sometimes happens when the hub is secured in the ordinary manner, the cap E has to be cut off before the wheel can be removed from the axle. The space within the cap E also serves as an oil-reservoir, from which the oil is fed to the axle B by the movement of the wheel itself, and into which the oil may be poured through a hole in the face of the cap E, said hole being stopped by a screw plug, as shown in fig. 2, thus forming a neat, convenient, and effective self-oiler.

I claim as new, and desire to secure by Letters Patent—

The nut D, provided with the screw-thread upon its outer circumference, and secured to the hub A by means of screws, in combination with the axle-box C, nut F, and cap E, substantially as described for the purpose specified.

The above specification of my invention signed by me this 13th day of June, 1867.

L. CROUCH.

Witnesses:
R. A. ONIS,
FRANK M. STEWART.